United States Patent
Djogo

(10) Patent No.: US 11,962,133 B2
(45) Date of Patent: Apr. 16, 2024

(54) AIR INSULATED SWITCH WITH VERY COMPACT GAP LENGTH

(71) Applicant: S&C Electric Company, Chicago, IL (US)

(72) Inventor: Goran Djogo, Mount Prospect, IL (US)

(73) Assignee: S&C Electric Company, Chicago, IL (US)

( * ) Notice: Subject to any disclaimer, the term of this patent is extended or adjusted under 35 U.S.C. 154(b) by 79 days.

(21) Appl. No.: 17/967,940

(22) Filed: Oct. 18, 2022

(65) Prior Publication Data

US 2023/0144416 A1    May 11, 2023

Related U.S. Application Data

(60) Provisional application No. 63/278,222, filed on Nov. 11, 2021.

(51) Int. Cl.
*H02B 13/075* (2006.01)
*H02B 13/035* (2006.01)

(52) U.S. Cl.
CPC ....... *H02B 13/075* (2013.01); *H02B 13/0358* (2013.01)

(58) Field of Classification Search
CPC .. H02B 13/01; H02B 13/0358; H02B 13/075; H01H 31/003
See application file for complete search history.

(56) References Cited

U.S. PATENT DOCUMENTS

| | | | | |
|---|---|---|---|---|
| 3,646,251 A | * | 2/1972 | Friedrich | H01B 17/28 174/142 |
| 4,415,763 A | * | 11/1983 | Cookson | H02G 5/063 174/109 |
| 8,035,054 B2 | * | 10/2011 | Ozawa | H02B 13/01 218/55 |
| 8,237,076 B2 | * | 8/2012 | Sato | H01H 33/666 218/119 |
| 8,247,725 B2 | * | 8/2012 | Morita | H01H 33/66207 218/120 |
| 8,872,054 B2 | * | 10/2014 | Yamazaki | H02B 13/01 218/139 |

FOREIGN PATENT DOCUMENTS

| | | | | |
|---|---|---|---|---|
| CN | 104124640 A | * | 10/2014 | |
| DE | 19648184 A1 | * | 5/1998 | ............. H02B 13/01 |
| EP | 3514899 A4 | * | 5/2020 | ......... G01R 31/1254 |
| JP | 2008010171 A | * | 1/2008 | ..... H01H 2033/6623 |

* cited by examiner

*Primary Examiner* — Robert J Hoffberg

(57) ABSTRACT

A grounding switch for grounding a high voltage cable in underground switchgear. The switch includes a solid insulation housing and a fixed electrode extending into one end of the housing and being encapsulated in the solid insulation housing. The switch also includes a ground electrode positioned at an opposite end of the housing from the fixed electrode, an air gap formed in the solid insulation housing between the fixed electrode and the ground electrode, and a movable electrode slidable positionable within the air gap to electrically connect and disconnect the fixed electrode to and from the ground electrode. An annular shielding electrode having a ridge is electrically coupled to the fixed electrode proximate the air gap, and shapes an electric field generated by the fixed electrode to be mostly confined within the solid insulation housing.

15 Claims, 2 Drawing Sheets ly from the U.S. Provisional Application No. 63/278,222, filed on Nov. 11, 2021, the disclosure of which is hereby expressly incorporated herein by reference for all purposes.

BACKGROUND

Field

This disclosure relates generally to a grounding switch for grounding an energized conductor in an underground switchgear and, in particular, a grounding switch for grounding a high voltage cable connected to underground switchgear.

Discussion of the Related Art

Power distribution networks include components that control the flow of power throughout the network. For underground power distribution networks it is typical to have electrical disconnect switches, fuses and/or circuit breakers (used to control power flow and to protect and isolate electrical equipment) to be assembled and packaged in an assembly know as switchgear, where the assembly is enclosed in an external housing that is mounted underground or mounted on, for example, a concrete pad. An underground mounted switchgear always has a dead-tank design, i.e., external surfaces of all components are grounded for safety and operational reasons.

Electrical cables going into and out of switchgear are connected to terminals of certain electrical devices or equipment, such as switches, within the switchgear. For an underground switchgear high voltage cables are typically connected through T-body connectors with conical interfaces to terminal conductors of the switchgear. The external surface of the T-body is grounded for safety and operation reasons. Whenever utility lineman have to workj on an existing cable, they have to ground it for safety reasons. Typically, they have to connect the cable with the T-body from the switchgear terminal and to "park" it on a separate isolated cone. This operation is cumbersome and hazardous because sometimes an arc can be created in a very limited space. Therefore, grounding switches are often employed in switchgear to connect the cables to ground as a safety measure when such personnel are present for replacing and servicing the equipment and devices in the switchgear. However, these grounding switches typically have long air gaps between the high voltage electrode that is connected to the cable and a ground electrode to prevent breakdown between the electrodes when the switch is open, which adds significant size and cost to the switchgear.

SUMMARY

The following discussion discloses and describes a grounding switch for grounding a high voltage cable in an underground switchgear. The switch includes a solid insulation housing, an outer grounded semicon layer on its external surface and a fixed electrode extending into one end of the housing and being encapsulated in the solid insulation housing. The switch also includes a ground electrode positioned at an opposite end of the housing from the fixed electrode, an air gap formed in the solid insulation housing between the fixed electrode and the ground electrode, and a movable electrode that is moved within the air gap to electrically connect and disconnect the fixed electrode to and from the ground electrode. A shielding electrode is electrically coupled to the fixed electrode proximate the air gap, and shapes the distribution of the electric field to have a high field region to be mostly contained within the solid insulation. In one embodiment, the shielding electrode is an annular electrode having a cup shape that encircles an end of the fixed electrode, where the shielding electrode includes a cylindrical body portion and a protrusion that extends from the body portion towards the ground electrode.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a grounding switch including a shielding electrode for grounding a high voltage cable is merely exemplary in nature, and is in no way intended to limit the invention or its applications or uses. For example, in the discussion herein the grounding switch is employed in underground switchgear. However, as will be appreciated by those skilled in the art, the grounding switch may have other uses and applications.

Figure 1:
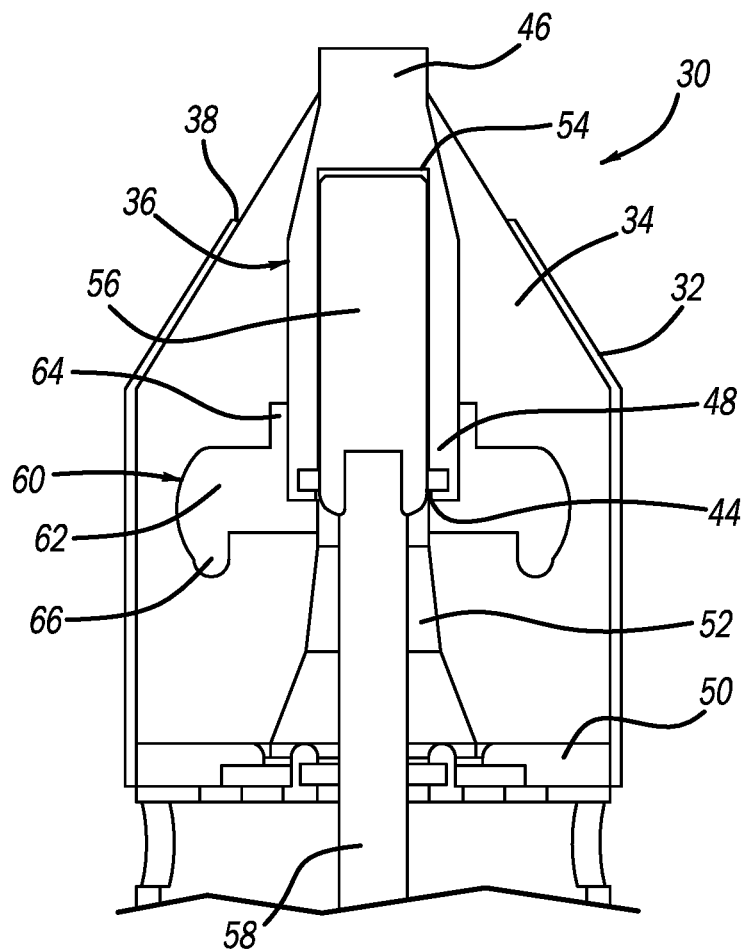
FIG. 1 is a broken-away, cross-sectional type view of a grounding switch having a reduced air gap in an open position.
Figure 2:
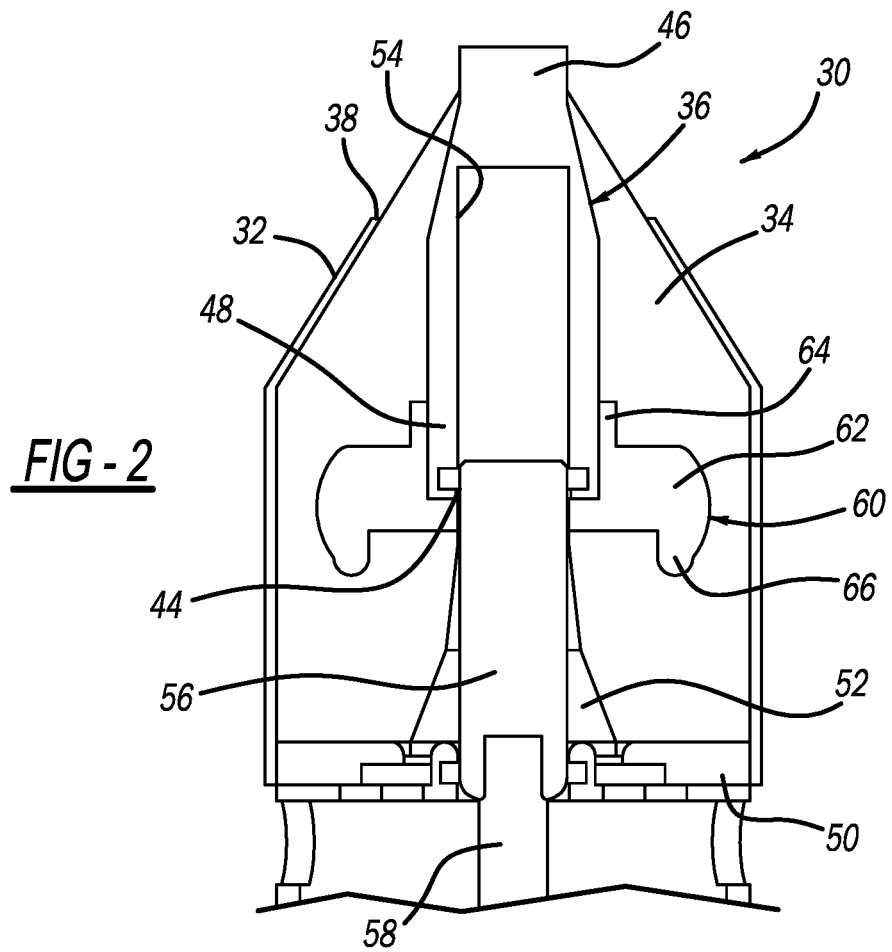
FIG. 2 is a broken-away, cross-sectional type view of the grounding switch shown in FIG. 1 in a closed position.

FIG. 1 is a broken-away, cross-sectional type view of a grounding switch 30 in an open position and FIG. 2 is a broken-away, cross-sectional type view of the grounding switch 30 in a closed position that can be used in underground switchgear to connect, for example, a high voltage cable, or other connection, to ground as a safety measure when the switchgear is being serviced and/or parts are being replaced by technicians, where the cable is not otherwise grounded. The switch 30 includes an outer semicon external surface layer 32 that encloses a solid insulation housing 34. A fixed high voltage electrode 36 extends into the semicon layer 32 through a top end 38 of the semicon layer 32 and is mostly encapsulated within the solid insulation housing 34, where the electrode 36 is connected, for example, to the high voltage cable (not shown in FIGS. 1 and 2) through a conical joint interface at a top end 46 of the electrode 36. A bottom end 48 of the electrode 36 is spaced some distance from a ground electrode 50 connected to ground across an air gap 52 formed in the solid insulation housing 34. The electrode 36 is cylindrically shaped and includes a center bore 54. A movable cylindrical electrode 56 is connected to an insulating pull rod 58 that is actuated by a suitable actuator (not shown), such as a solenoid, to move the electrode 56 into and out of the bore 54 through an opening 44 in the bottom end 48 and connect the fixed electrode 36 to and disconnect the fixed electrode 36 from the ground electrode 50, where the movable electrode 56 is shown in the up and ground disconnect position in FIG. 1 and in the down and ground connect position in FIG. 2.

Figure 3:
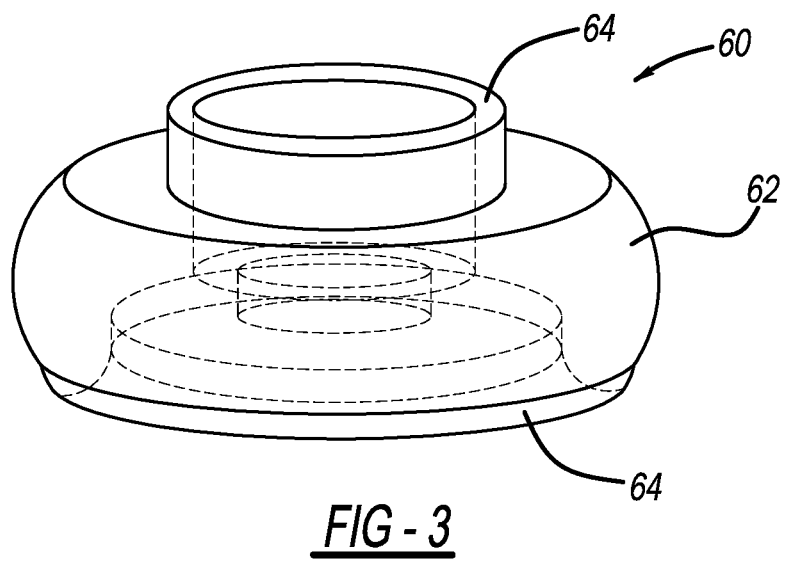
FIG. 3 is an isometric view of a shielding electrode in the grounding switch shown in FIG. 1.

Because of high voltages involved, in the known grounding switches, the air gap 52 between the high voltage electrode 36 and the ground electrode 50 was significantly longer, such as 10 inches, to prevent arcing therebetween during normal operation (and during impulse overvoltage on the cable) when the switch is open. However, that increases the overall size of the grounding switch. In order to reduce the length of the air gap 52, the grounding switch 30 includes an annular shielding electrode 60 electrically coupled to and extending around the bottom end 48 of the fixed electrode 36, as shown, where the shielding electrode 60 can be metallic or insulating with a conductive surface. The shielding electrode 60 has a cup shape defined by an annular body portion 62, a top rim 64 and a protrusion 66. An isometric view of the shielding electrode 60 is shown in FIG. 3 separated from the grounding switch 30. This shape of the shielding electrode 60 and its position with respect to the semicon layer 32, the grounded electrode 50 and the air gap 52 causes the electric field created by high voltage on the fixed electrode 36 to be non-uniform and enhanced at a tip of the protrusion 66, and, due to non-uniformity, to become significantly lower as it extends in the solid insulation housing 34 towards the grounding electrode 50 and towards the air gap 52. If a sufficient distance is provided between the tip of the protrusion 66 and the air gap 52, the high field region is caused to be mainly confined within the solid insulation housing 34 so that the electric field within the air gap 52 is significantly reduced and is approximately uniform. For a specified maximum impulse voltage, this shape of the electric field distribution prevents breakdown from occurring in the air gap 52, which prevents arcing across the air gap 52 to the ground electrode 50.

In one non-limiting embodiment, for the length of the air gap 52 of 2.5" between the electrodes 36 and 50 and with the overall OD of the switch 30 of 5.6", the switch 30 has an impulse withstand voltage of more than 160 kV. All of the electric field concentrations are located in the solid insulation housing 34 where they cannot lead to impulse breakdown at a maximum required impulse withstand voltage. Even though the solid insulation housing 34 can take a very high impulse field without breakdown, the continuous AC field in the solid insulation housing 34 still has to be limited to account for possible electrical aging. The field in the solid insulation housing 34 at a continuous AC voltage has to be lower than a certain empirical maximum continuous electric field that depends on the material of the solid insulation housing 34. The shape of the shielding electrode 60 can be determined iteratively by any available electromagnetic field calculation software. For a given impulse voltage and a given continuous AC voltage the geometrical parameters (which include the length and OD of the air gap 52, OD of the solid insulation housing 34, the length and ID of the protrusion 66 and the rounding radiuses of the protrusion 66) are varied in order to provide a maximum field in the air gap 52 to be below 3 kV/mm and a maximum field on the tip of the protrusion 66 to be below the empirical maximum continuous field for the given solid insulation material.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A grounding switch comprising: a solid insulation housing;
   an outer grounded semicon layer on an external surface of the housing;
   a fixed electrode extending into one end of the housing and being encapsulated within the solid insulation housing;
   a ground electrode positioned at an opposite end of the housing from the fixed electrode;
   an air gap formed in the solid insulation housing between the fixed electrode and the ground electrode;
   a movable electrode slidably positionable within the air gap to electrically connect and disconnect the fixed electrode to and from the ground electrode; and
   an annular shielding electrode electrically coupled to and encircles an end of the fixed electrode proximate the air gap, the shielding electrode shaping an electric field generated by the fixed electrode to be mostly contained within the solid insulation housing, the annular shielding electrode includes a cylindrical body portion, a protrusion that extends from the cylindrical body portion towards the ground electrode, and a rim coupled to the fixed electrode.

2. The grounding switch according to claim 1 wherein the fixed electrode is a cylindrically shaped electrode.

3. The grounding switch according to claim 1 wherein the shielding electrode is a metal electrode or has a conductive surface.

4. The grounding switch according to claim 1 wherein the air gap has a length of 2.5" between the fixed electrode and the ground electrode.

5. The grounding switch according to claim 1 wherein the grounding switch provides an electrical connection to a ground for a high voltage cable in an underground switchgear.

6. A grounding switch comprising:
   a solid insulation housing;
   an outer grounded semicon layer on an external surface of the housing;
   a cylindrical fixed electrode extending into one end of the housing and being encapsulated within the solid insulation housing, the fixed electrode having a center bore;
   a ground electrode positioned at an opposite end of the housing from the fixed electrode;
   an air gap formed in the solid insulation housing between the fixed electrode and the ground electrode;
   a movable electrode slidably positionable within the air gap and the center bore to electrically connect and disconnect the fixed electrode to and from the ground electrode; and
   an annular shielding electrode electrically coupled to and encircles an end of the fixed electrode proximate the air gap, the shielding electrode shaping an electric field generated by the fixed electrode to be mostly contained within the solid insulation housing, the annular shielding electrode includes a cylindrical body portion, a protrusion that extends from the cylindrical body portion towards the ground electrode, and a rim coupled to the fixed electrode.

7. The grounding switch according to claim 6 wherein the annular shielding electrode is a metal electrode or has a conductive surface.

8. The grounding switch according to claim 6 wherein the air gap has a length of 2.5" between the fixed electrode and the ground electrode for an impulse withstand voltage rating of 150 kV.

9. The grounding switch according to claim 6 wherein the grounding switch provides an electrical connection to a ground for a high voltage cable in an underground switchgear.

10. A grounding switch for providing an electrical connection to a ground for a high voltage cable in an underground switchgear, the grounding switch comprising:
  a fixed electrode;
  a ground electrode spaced from the fixed electrode;
  an air gap formed between the fixed electrode and the ground electrode;
  a movable electrode slidably positionable within the air gap to electrically connect and disconnect the fixed electrode to and from the ground electrode; and
  an annular shielding electrode electrically coupled to and encircles an end of the fixed electrode proximate the air gap, the shielding electrode shaping an electric field generated by the fixed electrode, the annular shielding electrode includes a cylindrical body portion, a protrusion that extends from the cylindrical body portion towards the ground electrode, and a rim coupled to the fixed electrode.

11. The grounding switch according to claim 10 further comprising a solid insulation, the air gap being formed in the solid insulation, the shaped electric field being mostly contained within the solid insulation.

12. The grounding switch according to claim 11 wherein the fixed electrode is a cylindrically shaped electrode.

13. The grounding switch according to claim 12 wherein the shielding electrode includes a cylindrical body portion and a protrusion that extends from the body portion towards the ground electrode.

14. The grounding switch according to claim 11 wherein the shielding electrode is a metal electrode or has a conductive surface.

15. The grounding switch according to claim 11 wherein the air gap has a length of 2.5" between the fixed electrode and the ground electrode for an impulse withstand voltage rating of 150 kV.

* * * * *